(12) United States Patent
Ueda et al.

(10) Patent No.: US 8,129,479 B2
(45) Date of Patent: Mar. 6, 2012

(54) PRESSURE SENSITIVE ADHESIVE COMPOSITION

(75) Inventors: Kazuhiko Ueda, Kobe (JP); Hiroshi Iwakiri, Kobe (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/586,858

(22) PCT Filed: Jan. 26, 2005

(86) PCT No.: PCT/JP2005/001026
§ 371 (c)(1),
(2), (4) Date: Oct. 27, 2006

(87) PCT Pub. No.: WO2005/073334
PCT Pub. Date: Aug. 11, 2005

(65) Prior Publication Data
US 2007/0123662 A1    May 31, 2007

(30) Foreign Application Priority Data
Jan. 30, 2004    (JP) ................. 2004-024173

(51) Int. Cl.
*C08L 83/00*    (2006.01)
*B32B 7/12*    (2006.01)

(52) U.S. Cl. ........... 525/474; 525/477; 428/355 R

(58) Field of Classification Search ........... 525/403, 525/477
See application file for complete search history.

(56) References Cited

U.S. PATENT DOCUMENTS

| | | | |
|---|---|---|---|
| 3,561,996 A * | 2/1971 | Young | 427/407.1 |
| 4,463,115 A | 7/1984 | Hirose et al. | |
| 4,543,403 A * | 9/1985 | Isayama et al. | 526/263 |
| 4,593,068 A * | 6/1986 | Hirose et al. | 525/100 |
| 4,665,127 A * | 5/1987 | Hirose et al. | 525/100 |
| 4,687,818 A * | 8/1987 | Kawakubo et al. | 525/404 |
| 4,735,829 A * | 4/1988 | Hirose et al. | 427/387 |
| 4,906,707 A * | 3/1990 | Yukimoto et al. | 525/403 |
| 4,963,626 A * | 10/1990 | Hirose et al. | 525/403 |
| 5,063,270 A * | 11/1991 | Yukimoto et al. | 524/306 |
| 5,064,896 A * | 11/1991 | Martin | 524/731 |
| 5,115,014 A * | 5/1992 | Wakabayashi et al. | 524/506 |
| 5,286,780 A * | 2/1994 | Iwakiri et al. | 524/500 |
| 5,331,049 A * | 7/1994 | Audett et al. | 525/100 |
| 5,541,266 A * | 7/1996 | Hasegawa et al. | 525/403 |
| 5,631,082 A * | 5/1997 | Hirose et al. | 428/343 |
| 5,684,094 A * | 11/1997 | Suzuki et al. | 525/403 |
| 6,077,896 A * | 6/2000 | Yano et al. | 524/308 |
| 6,207,766 B1 * | 3/2001 | Doi et al. | 525/403 |
| 6,369,187 B1 * | 4/2002 | Fujita et al. | 528/29 |
| 6,426,392 B1 * | 7/2002 | Chiba et al. | 525/326.5 |
| 6,437,071 B1 * | 8/2002 | Odaka et al. | 528/15 |
| 6,437,072 B1 * | 8/2002 | Jyono et al. | 528/25 |
| 6,649,016 B2 * | 11/2003 | Wu et al. | 156/329 |
| 6,706,813 B2 * | 3/2004 | Chiba et al. | 525/95 |
| 2002/0077420 A1 * | 6/2002 | Chiba et al. | 525/89 |
| 2002/0086942 A1 * | 7/2002 | Fujita et al. | 525/100 |
| 2003/0105261 A1 * | 6/2003 | Komitsu et al. | 528/10 |
| 2004/0214950 A1 * | 10/2004 | Nakamura et al. | 525/88 |

FOREIGN PATENT DOCUMENTS

| | | |
|---|---|---|
| JP | 59-71377 A | 4/1984 |
| JP | SHO-59-71377 | 4/1984 |
| JP | 60-35069 A | 2/1985 |
| JP | SHO-60-35069 | 2/1985 |
| JP | 61-116327 A | 6/1986 |
| JP | SHO-61-116327 | 6/1986 |
| JP | 2-132174 A | 5/1990 |
| JP | HEI-2-132174 | 5/1990 |
| JP | HEI-5-59267 | 3/1993 |
| JP | 05302026 A * | 11/1993 |
| JP | 2003-105303 | 4/2003 |
| JP | 2003-105303 A | 4/2003 |
| JP | 2004-115780 | 4/2004 |
| JP | 2004-115780 A | 4/2004 |

OTHER PUBLICATIONS

Certified translation of JP 2005-059267 provided by FLS, Inc.*
Certified English-language translation of JP-05302026; translation by Schreiber Translation, Inc., Apr. 2009.*
Chemistry and Application of Adhesive and Pressure Sensitive Adhesive, pp. 100-104.
Sealing Material for Architecture—Fundamental and Proper Way to Use, pp. 1.

* cited by examiner

*Primary Examiner* — Robert Loewe
(74) *Attorney, Agent, or Firm* — Sughrue Mion, PLLC

(57) ABSTRACT

The present invention has its object to provide a pressure sensitive adhesive composition which can be applied using no organic solvent and which manifests excellent pressure sensitive adhesion characteristics. This object can be achieved by a pressure sensitive adhesive composition which comprises, as essential constituents, the following: (A) a hydrolyzable silyl group-containing organic polymer containing at least 1.3 hydrolyzable silyl groups per molecule and having a number average molecular weight of 15,000 to 100,000; (B) a hydrolyzable silyl group-containing organic polymer containing 0.3 to 1.3 hydrolyzable silyl groups per molecule and having a number average molecular weight of 500 to 15,000; and (C) a tackifier resin.

10 Claims, No Drawings

PRESSURE SENSITIVE ADHESIVE COMPOSITION

TECHNICAL FIELD

The present invention relates to a pressure sensitive adhesive composition. More particularly, it relates to a pressure sensitive adhesive composition which comprises, as essential components, (A) a hydrolyzable silyl group-containing organic polymer containing at least 1.3 hydrolyzable silyl groups per molecule and having a number average molecular weight of 15,000 to 100,000, (B) a hydrolyzable silyl group-containing polyether polymer containing 0.3 to 1.3 hydrolyzable silyl groups per molecule and having a number average molecular weight of 500 to 15,000 and (C) a tackifier resin.

BACKGROUND ART

Pressure sensitive adhesive compositions comprising a curable polymer combined with a tackifier resin are well known in the art.

Pressure sensitive adhesive compositions comprising a hydrolyzable silyl group-containing oxyalkylene polymer among such curable polymers and a tackifier resin can be applied for coating using no organic solvent or using almost no organic solvent and therefore have been proposed as pressure sensitive adhesive compositions exerting no adverse influences on the environment (cf. e.g. Japanese Kokai Publication Sho59-71377). However, the above-mentioned pressure sensitive adhesive compositions are insufficient in adhesive strength and, when a tackifier resin is incorporated in an increased amount so that the adhesive strength may be enhanced, the viscosity of the resulting composition becomes very high and it becomes necessary to use a solvent in an increased amount.

On the other hand, a curable composition comprising a hydrolyzable silyl group-containing high-molecular polymer and a hydrolyzable silyl group-containing low-molecular compound has been proposed (cf. e.g. Japanese Kokai Publication Hei05-59267). This curable composition is known to have a reduced viscosity without any substantial decrease in flexibility and to be effective in avoiding staining of places surrounding the site of application and in preventing the adhesion properties from being adversely affected. However, the use thereof as a pressure sensitive adhesive has not been disclosed.

SUMMARY OF THE INVENTION

It is an object of the present invention to provide a pressure sensitive adhesive composition which can be applied using no solvent or almost no solvent and has good pressure sensitive adhesive characteristics.

The present inventors made various investigations and, as a result, found that a pressure sensitive adhesive composition which comprises the following components (A), (B) and (C) can be applied using no organic solvent or using almost no organic solvent and can manifest good adhesive strength after curing, and have now completed the present invention:

(A) A hydrolyzable silyl group-containing organic polymer containing at least 1.3 hydrolyzable silyl groups per molecule and having a number average molecular weight of 15,000 to 100,000;
(B) A hydrolyzable silyl group-containing polyether polymer containing 0.3 to 1.3 hydrolyzable silyl groups per molecule and having a number average molecular weight of 500 to 15,000;
(C) A tackifier resin.

EFFECT OF THE INVENTION

The pressure sensitive adhesive composition of the present invention can be applied using no organic solvent or almost no organic solvent and has good pressure sensitive adhesive characteristics.

DETAILED DESCRIPTION OF THE INVENTION

The (A) component to be used in the practice of the invention, namely the organic polymer containing at least 1.3 hydrolyzable silyl group per molecule, is not particularly restricted but the main chain skeleton thereof, for instance, may be any of such generally known organic polymers as oxyalkylene polymers, alkyl (meth)acrylate polymers, saturated hydrocarbon polymers and polyester polymers. Among them, oxyalkylene polymers are particularly preferred in view of their low temperature characteristics, flexibility and compatibility with other components and, therefore, in the following description of the polymer (A), the one whose main chain skeleton is an oxyalkylene polymer is described as a typical example.

The oxyalkylene polymer is a polymer comprising a repeating unit or units represented by the general formula (1)

$$-R^1-O- \qquad (1)$$

(wherein $R^1$ is a divalent alkylene group.)

In the general formula (1), $R^1$ is preferably a straight or branched alkylene group containing 1 to 14 carbon atoms, more preferably 2 to 4 carbon atoms. As specific examples of the repeating unit represented by the general formula (1), there may be mentioned $-CH_2O-$, $-CH_2CH_2O-$, $-CH_2CH(CH_3)O-$, $-CH_2CH(C_2H_5)O-$, $-CH_2C(CH_3)_2O-$, $-CH_2CH_2CH_2CH_2O-$ and the like. The main chain skeleton of the oxyalkylene polymer may comprise only one repeating unit species or two or more repeating unit species. In particular, polymers comprising $-CH_2CH(CH_3)O-$ as the main repeating unit are preferred from the raw material availability and workability viewpoint. The polymer main chain may contain another repeating unit species other than the oxyalkylene group species. In this case, the total sum of oxyalkylene units in the polymer is preferably not less than 80% by weight, more preferably not less than 90% by weight.

Also in the hydrolyzable silyl group-containing organic polymer containing 0.3 to 1.3 hydrolyzable silyl groups per molecule, namely the (B) component to be used in the practice of the invention, the main chain of which polymer is substantially composed of a repeating unit or units represented by the general formula $-R^1-O-$ ($R^1$ being a divalent alkylene group), the group $R^1$ is as described above.

Each of the (A) component polymer and the (B) component polymer may be a straight chain polymer or a branched chain polymer, or a mixture of them. For attaining good peeling properties, the proportion of a straight chain polymer in the polymer is preferably not lower than 50% by weight.

As for the molecular weight, the (A) component polymer preferably has a number average molecular weight of 15,000 to 100,000, more preferably 20,000 to 50,000. When the number average molecular weight is lower than 15,000, the pressure sensitive adhesive composition obtained will be excessively high in viscosity and no good pressure sensitive adhesion characteristics will be obtained. Conversely, when the number average molecular weight is above 100,000, the viscosity will become excessively high and the workability will unfavorably decline markedly. The number average molecular weight can be determined by various methods. Generally, the conversion calculation based on the result of terminal group analysis of the oxyalkylene polymer or the determination by gel permeation chromatography (GPC) is a common method. The term "molecular weight" as used herein denotes the molecular weight determined by gel permeation chromatography (GPC).

On the other hand, the hydrolyzable silyl group-containing organic polymer, namely the (B) component, preferably has a molecular weight of 500 to 15,000, particularly preferably 1,500 to 12,000, most preferably 3,000 to 10,000. If the polymer (B) has a molecular weight exceeding 15,000, it may possibly become impossible to reduce the viscosity of the pressure sensitive adhesive composition to a satisfactory extent.

In the practice of the present invention, the hydrolyzable silyl group-containing organic polymer whose main chain skeleton is an oxyalkylene polymer, which is preferably used as the (A) component, and the hydrolyzable silyl group-containing organic polymer comprising a repeating unit or units represented by the general formula —$R^1$—O—($R^1$ being a divalent alkylene group), which is to serve as the (B) component, each can be obtained by introducing a hydrolyzable silyl group into an oxyalkylene polymer known as hydroxyl-terminated polyether polyol.

Methods for producing such polymers have been proposed, for example, in Japanese Kokai Publication Hei03-72527, Japanese Kokai Publication Hei03-47825, Japanese Kokai Publication Hei03-79627, Japanese Kokoku Publication Sho46-30711, Japanese Kokoku Publication Sho45-36319 and Japanese Kokoku Publication Sho46-17553.

On that occasion, the oxyalkylene polymer to serve as the main chain skeleton can be produced by reacting, for example, a monoepoxide such as an alkylene oxide with such an initiator as a hydroxy compound having at least one hydroxyl group in the presence of such a catalyst as an alkali metal catalyst, metalloporphyrin catalyst, compound metal cyanide complex catalyst or phosphazene catalyst. Particularly preferred among these are the production methods using a compound metal cyanide complex catalyst or a phosphazene catalyst. According to these particularly preferred methods, oxyalkylene-based high-molecular polymers can be obtained with ease, and the polymers obtained are narrow in molecular weight distribution and therefore low in viscosity for their high molecular weight and, in addition, produce no color hue problems. In cases where an oxyalkylene polymer having a relatively low molecular weight is still sufficient, the oxyalkylene polymer may be obtained by reacting an oxyalkylene polymer obtained by using an alkali metal catalyst with a dihalide compound in the manner of molecular weight increasing reaction.

The hydroxyl compound to be used as the initiator for ring opening polymerization of a monoepoxide(s) preferably has two or more functional groups and includes, among others, propylene glycol, glycerol, pentaerythritol and, further, PPG, PPT (polyoxypropylenetriol) and so on.

As the polyether to be used as the initiator, there may specifically be mentioned polyoxyethylene, polyoxypropylene, polyoxybutylene, polyoxyhexylene, polyoxytetramethylene, and copolymers of these.

Particularly preferred polyethers are polyoxypropylene diol and polyoxypropylene triol, allyl-terminated polyoxypropylene and methallyl-terminated polyoxypropylene, among others.

The hydrolyzable silyl group so referred to herein is a silicon-containing functional group capable of being crosslinked under siloxane bond formation.

For example, silyl groups represented by the following general formula (I) are typical hydrolyzable silyl groups. However, the hydrolyzable silyl group so referred to herein is not limited thereto.

—$SiX_aR^2_{3-a}$ (I).

In the above formula, $R^2$ is a substituted or unsubstituted monovalent organic group containing 1 to 20 carbon atoms, preferably an alkyl group containing not more than 8 carbon atoms or a phenyl or fluoroalkyl group, particularly preferably methyl, ethyl, propyl, butyl, hexyl, cyclohexyl, phenyl or the like.

X is a hydrolyzable group, for example a halogen atom or an alkoxy, alkenyloxy, acyloxy, amido, amino, aminoxy, ketoximate, acid amide, or halide group.

Among them, the carbon-containing hydrolyzable group preferably contains not more than 6 carbon atoms, particularly preferably not more than 4 carbon atoms. As preferred hydrolyzable groups, there may be mentioned lower alkoxy groups containing not more than 4 carbon atoms, in particular methoxy, ethoxy, propoxy, propenyloxy and the like. The symbol a represents 1, 2 or 3 and particularly preferably it is 2 or 3.

The method of introducing a silyl group represented by the general formula (I) into the oxyalkylene polymer is not particularly restricted but the silyl group introduction can be realized, for example, by the following methods.

(α) The method comprising introducing an olefinic group into a hydroxyl or like functional group-containing oxyalkylene polymer, followed by reacting with a hydrosilyl compound represented by the general formula (2):

$HSiX_aR^2_{3-a}$ (2)

(wherein $R^2$, X and a are as defined above.)

Here, as the olefinic group introduction method, there may be mentioned, among others, the method comprising reacting a compound having both an unsaturated group and a functional group capable of reacting with a hydroxyl group with the hydroxyl group of the oxyalkylene polymer under formation of such a bond as an ether, ester, urethane or carbonate bond, and the olefinic group introduction method comprising adding an olefinic group-containing epoxy compound such as allyl glycidyl ether for copolymerization on the occasion of alkylene oxide polymerization.

(β) The method comprising reacting a compound represented by the general formula (3) given below with an oxyalkylene polymer containing a functional group capable of reacting with the isocyanate compound.

$(R^2—)_{3-a}SiX_aR^3—NCO$ (3)

(wherein, $R^2$, X and a are as defined above, and $R^3$ is a divalent hydrocarbon group containing 1 to 17 carbon atoms.)

(γ) The method comprising reacting a polyisocyanate compound such as tolylene diisocyanate with an oxyalkylene polymer containing a functional group capable of reacting with the isocyanate compound for isocyanate group introduction, followed by reacting the W group of a silicon compound represented by the general formula (4):

$(R^2—)_{3-a}SiX_a—R^3W$ (4)

(wherein $R^2$, $R^3$, X and a are as defined above, and W is an active-hydrogen-containing group selected from among hydroxyl, carboxyl, mercapto and (primary or secondary) amino groups.)

(δ) The method comprising introducing an olefinic group into an oxyalkylene polymer containing a functional group allowing introduction of the olefinic group thereinto and then reacting the olefinic group with a silicon compound represented by the general formula (4) in which W is a mercapto group.

The hydrolyzable silyl group-containing organic polymer, which is the (A) component to be used according to the invention, preferably contains 1.3 to 5, particularly preferably 1.4 to 3 hydrolyzable silyl groups in each molecule.

When the number of hydrolyzable silyl groups in the (A) component is smaller than 1.3 per molecule, it will be impossible to obtain a sufficient curing rate indispensable for a pressure sensitive adhesive composition. Conversely, when the number is greater than 5, the resulting pressure sensitive adhesive composition will become hardened and no good pressure sensitive adhesive properties will be obtained.

The number of hydrolyzable silyl groups in the (B) component to be used in the practice of the invention is preferably 0.3 to 1.3 (smaller than 1.3), particularly preferably 0.4 to 1.2 (not more than 1.2), per molecule.

When the number of hydrolyzable silyl groups in the (B) component is smaller than 0.3 per molecule, that compound may function as a plasticizer, possibly leading to failure to obtain good pressure sensitive adhesive characteristics. When it is 1.3 or greater, the flexibility of the pressure sensitive adhesive composition may be impaired, possibly leading to failure to obtain good pressure sensitive adhesive characteristics.

In the practice of the invention, the (B) component is preferably used in an amount of 1 to 200 parts by weight, particularly preferably 1 to 100 parts by weight, per 100 parts by weight of the (A) component As examples of the (C) component tackifier resin to be used in accordance with the invention, there may be mentioned terpene resins, terpene-phenol resins, petroleum resins and rosin ester resins, among others. These may be used singly or two or more of them may be used in admixture according to need.

As for the compounding ratio in the practice of the invention, the (C) component is preferably used in an amount of 5 to 150 parts by weight, more preferably 10 to 120 parts by weight, relative to a combined total of 100 parts by weight of the (A) component and the (B) component. The particularly preferred range is 30 to 100 parts by weight. At levels lower than 5 parts by weight, the resulting composition may possibly become poor in pressure sensitive adhesive properties and, at levels exceeding 150 parts by weight, the characteristics of the hydrolysable silyl group-containing organic polymer, namely good affinity for various adherends, hydrophilicity and chemical stability, among others, may possibly be sacrificed.

The method of preparing the pressure sensitive adhesive composition of the invention is not particularly restricted but use can be made of any of the ordinary methods comprising, for example, compounding the above-mentioned components together and kneading the mixture at ordinary temperature or under heating using a mixer, roll, kneader or the like, or dissolving each component in a small amount of an appropriate solvent, followed by mixing together.

The pressure sensitive adhesive composition of the invention can further contain one or more of various curing catalysts, fillers and additives known in the art.

As for the curing catalyst, those known in the art can be widely used. As specific examples thereof, silanol condensation catalysts including titanium compounds such as titanium tetrabutoxide, tetrapropyl titanate, tetraacetylacetonate titanium, acetoacetate titanium, etc.; tetravalent tin compounds such as dibutyltin dilaurate, dibutyltin maleate, dibutyltin phthalate, dibutyltin dioctanoate, dibutyltin di(ethyl hexanoate), dibutyltin di(methyl maleate), dibutyltin di(ethyl maleate), dibutyltin di(butyl maleate), dibutyltin di(octyl maleate), dibutyltin di(tridecyl maleate), dibutyltin di(benzyl maleate), dibutyltin diacetate, dioctyltin di(ethyl maleate), dioctyltin di(octyl maleate), dibutyltin dimethoxide, dibutyltin di(nonyl phenoxide), dibutenyltin oxide, dibutyltin di(acetyl acetonate), dibutyltin di(ethyl acetoacetate), reaction products of dibutyltin oxide with phthalic esters, etc.; divalent tin compounds such as stannous octanoate, tin naphthenate, stannous stearate, stannous versatate, etc.; organoaluminum compounds such as aluminum tris(acetylacetonate), aluminum tris(ethyl acetoacetate), diisopropoxyaluminum-ethyl acetoacetate, etc.; zirconium compounds such as zirconium tetraacetylacetonate etc.; lead octanoate; amine compounds such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, 1,8-diazabicyclo(5.4.0)undecene-7 (DBU), etc. or salts of these amine compounds with carboxylic acids etc.; low molecular weight polyamide resins obtainable from an excess of a polyamine with polybasic acids; reaction products of an excess of a polyamine with epoxy compounds; silane coupling agents having an amino group such as γ-aminopropyltrimethoxysilane, N-(β-aminoethyl)aminopropylmethyldimethoxysilane, etc.; other known silanol condensation catalysts such as other acid catalysts and basic catalysts, among others, can be mentioned. These catalysts may be used each independently or in a combination of two or more species.

The amount of use of such a curing catalyst is preferably about 0.1 to 20 parts by weight relative to a combined total of 100 parts by weight of the organic polymer (A) and the organic polymer (B). Too low amount of use of the curing catalyst is not preferable, because the curing speed is decreased and the curing reaction does not proceed sufficiently. On the other hand, too high amount of use of the curing catalyst is not preferable, because local exothermic reaction and foaming take place in curing and a good cured product cannot be easily obtained.

For the purpose of enhancing the activity of the condensation catalyst, the curable composition of the invention may be supplemented with a silicon compound which may be represented by the general formula:

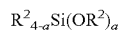

$$R^2_{4-a}Si(OR^2)_a$$

(wherein the $R^2$ groups and a represent the same as the above) This silicon compound is not restricted but the compounds of the above general formula wherein at least one of R directly bonded to Si atom is an aryl group of 6 to 20 carbon atoms, such as phenyltrimethoxysilane, phenylmethyldimethoxysilane, phenyldimethylmethoxysilane, diphenyldimethoxysilane, diphenyldiethoxysilane, and triphenylmethoxysilane, are preferred because these are especially effective in accelerating the curing reaction of the composition. In consideration of cost and availability, diphenyldimethoxysilane and diphenyldiethoxysilane are particularly preferred.

When this silicon compound is used, the formulating amount thereof is preferably about 0.01 to 20 parts by weight, more preferably 0.1 to 10 parts by weight, relative to a combined total of 100 parts by weight of the polymer (A) and polymer (B). If the formulating amount of the silicon compound is below the above range, the accelerating effect on the curing reaction tends to be insufficient. On the other hand, if the formulating amount of the silicon compound exceeds the above range, the hardness and tensile strength of the cured product tend to be decreased.

The composition of the invention may be supplemented with a silane coupling agent, a reaction product of a silane coupling agent, or a compound other than a silane coupling agent as an adhesion-imparting agent. Specifically, the silane coupling agent includes isocyanato group-containing silanes such as γ-isocyanatopropyltrimethoxysilane, γ-isocyanatopropyltriethoxysilane, γ-isocyanatopropylmethyldiethoxysilane, γ-isocyanatopropylmethyldimethoxysilane, etc.; amino group-containing silanes such as γ-aminopropyltrimethoxysilane, γ-aminopropyltriethoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-ureidopropyltrimethoxysilane, N-phenyl-γ-aminopropyltrimethoxysilane, N-benzyl-γ-aminopropyltrimethoxysilane, N-vinylbenzyl-γ-aminopropyltriethoxysilane, etc.; mercapto group-containing silanes such as γ-mercaptopropyltrimethoxysilane, γ-mercaptopropyltriethoxysilane, γ-mercaptopropylmethyldimethoxysilane, γ-mercaptopropylmethyldiethoxysilane, etc.; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, β-(3,4-epoxycyclohexyl)ethyltriethoxysilane, etc.; carboxysilanes such as β-carboxyethyltriethoxysilane, β-carboxyethylphenylbis(2-methoxyethoxy)silane, N-β-(carboxymethyl)aminoethyl-γ-aminopropyltrimethoxysilane, etc.; vinyl type unsaturated group-containing silanes such as vinyltrimethoxysilane, vinyltriethoxysilane, γ-methacryloyloxypropylmethyldimethoxysilane, γ-acryloyloxypropylmethyltriethoxysilane, etc.; halogen-containing silanes such as γ-chloropropyltrimethoxysilane etc.; and isocyanurate silanes such as tris(trimethoxysilyl) isocyanurate and so forth. Furthermore, the modification derivatives of these silanes, such as amino-modified silyl polymers, silylated amino group-containing polymers, unsaturated aminosilane complexes, phenylamino(long-chain)alkylsilanes, aminosilylated silicones, silylated polyesters, etc. may also be used likewise as silane coupling agents. In the present invention, the silane coupling agent is used generally within the range of 0.1 to 20 parts by weight, particularly preferably 0.5 to 10 parts by weight, relative to a combined total of 100 parts by weight of the polymer (A) and the polymer (B).

Now, the method of producing pressure sensitive adhesive products using the pressure sensitive adhesive composition of the invention is explained by describing an exemplary production process. However, the fundamental production method comprises applying the pressure sensitive adhesive composition to a support, followed by thermal curing, and the following example has no restrictive meaning.

The pressure sensitive adhesive composition of the invention is applied to a support using a coater and thermally cured to give a pressure sensitive adhesive product. Usable as the support are synthetic resin or modified natural films, paper, all kinds of cloth, metal foils and so forth. Specific examples of the support material include, but are not limited to, polyethylene, polypropylene, polyimides, polycarbonates, polyvinyl chloride, polyesters, polyurethanes, cellophane, impregnated paper, coated paper, woodfree paper, kraft paper, cloths, acetate cloths, nonwoven fabrics, glass cloths and metal foils. These may be used singly or at least two species may be used in the form of laminates.

The application can be carried out in the manner of either direct application to the support or application to a release liner, followed by transfer to the support after curing.

For securing the applicability to the support or release liner or the like, it is effective to incorporate such an additive as a cissing inhibitor or release promoter in the composition. Silicone type, acrylic or fluorine-containing cissing inhibitor or release promoter, for instance, can be used.

Usable as the release liner for use in the process comprising application thereto, curing and transfer to the support are those coated with a silicone, olefin-derived or fluorine-containing release agent and, from the cost and secured peelability viewpoint, the use of olefin-derived or solventless silicone release agents are particularly preferred.

The method of thermal curing is not particularly restricted. The curing temperature may vary according to the polymer species used and the compound(s) added. Generally, however, it is preferably within the range of 50° C. to 180° C. The curing time may vary depending on the polymer species used, the compound(s) added and the reaction temperature, among others, but it is generally within the range of 0.1 minute to 24 hours, preferably 1 minute to 10 hours, more preferably 1 minute to 1 hour.

The pressure sensitive adhesive composition of the invention can be used in various pressure sensitive adhesive products intended for use in or for office works in general, paper diapers, PP film adhesion, repeelable products, general packaging, electric appliances and fixation. The pressure sensitive adhesive products produced by using the pressure sensitive adhesive composition of the invention can be used in the form of pressure sensitive adhesive tapes for packaging, pressure sensitive adhesive tapes for office use, masking tapes in painting, pressure sensitive adhesive tapes for electrical insulation, pressure sensitive adhesive tapes for bundling, pressure sensitive adhesive tapes for protective use, pressure sensitive adhesive tapes and sheets for discrimination or decoration, sports tapes, double-sided pressure sensitive adhesive tapes, films and tapes for coping with electromagnetic disturbances, repeelable films and tapes, decorative laminate films, tapes for transporting semiconductor chips, marking films, protective films in deep drawing, films for preventing glass pieces from scattering, pressure sensitive foaming adhesive tapes, waterproofing/water shut off tapes, pressure sensitive adhesive tapes for corrosion prevention, pressure sensitive adhesive tapes for surface protection, pressure sensitive adhesive tapes for dicing, pressure sensitive adhesive tapes for back grinding, pressure sensitive adhesive sheets for printing, pressure sensitive adhesive labels and so on.

In producing the pressure sensitive adhesive products mentioned above, one or more of chemicals, electromagnetic wave absorbers, light absorbers, foaming ingredients and so forth may be added according to the intended use of the products.

BEST MODES FOR CARRYING OUT THE INVENTION

The following examples illustrate the present invention more specifically. These examples are, however, by no means limitative of the scope of the invention.

Production Example 1

Polyoxypropylene monool with a number average molecular weight of 4,300 (on the polystyrene equivalent basis) as determined by GPC was prepared by polymerizing propylene oxide using NEWPOL LB285 (product name, product of Sanyo Chemical Industries, Ltd., polyoxypropylene monobutylether, number average molecular weight of 1,200) as an initiator, together with zinc hexacyanocobaltate-glyme complex and, then, each terminal hydroxyl group was converted to a metaloxy group, which was reacted with allyl chloride for introducing the unsaturated group into a terminus or termini. Thereafter, the obtained product was reacted with methyldimethoxysilane to give a polymer (B-1) having one methyldimethoxysilyl group at one terminus. The polymer (B-1) had a viscosity (23° C.; type B viscometer) of 0.6 Pa·s.

Production Example 2

Each terminal hydroxyl group of Actcol P-23 (product of MITSUI TAKEDA CHEMICALS, INC., polyoxypropylene glycol) was converted to a metaloxy group, which was reacted with allyl chloride for introducing the unsaturated group into a terminus or termini. Thereafter, the terminal groups were reacted with 0.5 equivalent of methyldimethoxysilane to give a methyldimethoxysilyl group-terminated polymer (B-2) with a number average molecular weight of 4,000 (on the polystyrene equivalent basis) as determined by GPC. The polymer (B-2) had a viscosity (23° C.; type B viscometer) of 0.6 Pa·s.

Production Example 3

Polyoxypropylene glycol with a number average molecular weight of 31,000 (on the polystyrene equivalent basis) as determined by GPC was prepared by polymerizing propylene oxide using Actcol P-23 as an initiator, together with zinc hexacyanocobaltate-glyme complex and, then, each terminal hydroxyl group was converted to a metaloxy group, which was reacted with allyl chloride for introducing the unsaturated group into all termini. Thereafter, the unsaturated groups were reacted with 0.75 equivalent of methyldimethoxysilane to give a methyldimethoxysilyl group-terminated polymer (A-1). The polymer (A-1) had a viscosity (23° C.; type B viscometer) of 46.8 Pa·s.

Production Example 4

Polyoxypropylene glycol with a number average molecular weight of 26,000 (on the polystyrene equivalent basis) as determined by GPC was prepared by polymerizing propylene oxide using Actcol P-23 as an initiator, together with zinc hexacyanocobaltate-glyme complex and, then, all the terminal groups were reacted with 0.85 equivalent of γ-aminoisocianatopropyltrimethoxysilane (Y-5187, product of Nippon Unicar Company Limited) to give a trimethoxysilyl group-terminated polymer (A-2). The polymer (A-2) had a viscosity (23° C.; type B viscometer) of 48.5 Pa·s.

Production Example 5

Polyoxypropylene glycol with a number average molecular weight of 10,800 (on the polystyrene equivalent basis) as determined by GPC was prepared by polymerizing propylene oxide using Actcol P-23 as an initiator, together with zinc hexacyanocobaltate-glyme complex and, then, each terminal hydroxyl group was converted to a metaloxy group, which was reacted with allyl chloride for introducing the unsaturated group into all termini. Thereafter, the unsaturated groups were reacted with 0.75 equivalent of methyldimethoxysilane to give a methyldimethoxysilyl group-terminated polymer (A-3). The polymer (A-3) had a viscosity (23° C.; type B viscometer) of 5.9 Pa·s.

Production Example 6

A polymer mixture (D-1) was obtained by blending 100 parts by weight of the polymer (A-1) with 30 parts by weight of the polymer (B-1). Then, a pressure sensitive adhesive composition (E-1) was obtained by admixing 50 parts by weight of YS Polyster S-145 (product of YASUHARA CHEMICAL CO., LTD., terpene-phenol resin) with 100 parts by weight of the polymer mixture (D-1). The pressure sensitive adhesive composition (E-1) had a viscosity of 280.2 Pa·s (23° C.; type B viscometer).

Production Example 7

A polymer mixture (D-2) was obtained by blending 100 parts by weight of the polymer (A-1) with 40 parts by weight of the polymer (B-2). Then, a pressure sensitive adhesive composition (E-2) was obtained by admixing 50 parts by weight of YS Polyster S-145 with 100 parts by weight of the polymer mixture (D-2). The pressure sensitive adhesive composition (E-2) had a viscosity of 225.6 Pa·s (23° C.; type B viscometer).

Production Example 8

A polymer mixture (D-3) was obtained by blending 100 parts by weight of the polymer (A-2) with 40 parts by weight of the polymer (B-1). Then, a pressure sensitive adhesive composition (E-3) was obtained by admixing 50 parts by weight of YS Polyster S-145 with 100 parts by weight of the polymer mixture (D-3). The pressure sensitive adhesive composition (E-3) had a viscosity of 232.2 Pa·s (23° C.; type B viscometer).

Production Example 9

A polymer mixture (D-4) was obtained by blending 100 parts by weight of the polymer (A-1) with 30 parts by weight of Actcol P-23. Then, a pressure sensitive adhesive composition (E-4) was obtained by admixing 50 parts by weight of YS Polyster S-145 (product of YASUHARA CHEMICAL CO., LTD., terpene-phenol resin) with 100 parts by weight of the polymer mixture (D-4). The pressure sensitive adhesive composition (E-4) had a viscosity of 279.5 Pa·s (23° C.; type B viscometer).

Production Example 10

A pressure sensitive adhesive composition (E-5) was obtained by admixing 100 parts by weight of YS Polyster S-145 with 100 parts by weight of the polymer mixture (A-1). The pressure sensitive adhesive composition (E-5) had a viscosity of 918.4 Pa·s (23° C.; type B viscometer).

Production Example 11

A pressure sensitive adhesive composition (E-6) was obtained by admixing 80 parts by weight of YS Polyster S-145 with 100 parts by weight of the polymer mixture (A-3). The pressure sensitive adhesive composition (E-6) had a viscosity of 290.4 Pa·s (23° C.; type B viscometer).

Example 1

The pressure sensitive adhesive composition (E-1) obtained in Production Example 6 was supplemented with Orgatix TC-100 (product of MATSUMOTO TRADING CO., LTD., titanium acetylacetonate) in an amount of 4 parts by weight and the resulting mixture was thoroughly stirred.

The obtained mixture was applied onto a 38-μm-thick polyester film to a size of 8 cm in width and 75 μm in thickness and heated at 130° C. for 3 minutes to give a pressure sensitive adhesive film.

Example 2

A pressure sensitive adhesive film was obtained in the same procedure as in Example 1 except that the pressure sensitive adhesive composition (E-2) was used in lieu of the pressure sensitive adhesive composition (E-1).

Example 3

A pressure sensitive adhesive film was obtained in the same procedure as in Example 1 except that the pressure sensitive adhesive composition (E-3) was used in lieu of the pressure sensitive adhesive composition (E-1).

Comparative Example 1

A pressure sensitive adhesive film was obtained in the same procedure as in Example 1 except that the pressure sensitive adhesive composition (E-4) was used in lieu of the pressure sensitive adhesive composition (E-1).

Comparative Example 2

Toluene (50 parts by weight) was added to the pressure sensitive adhesive composition (E-5) for the purpose of reducing the viscosity for application and, after mixing up, 4 parts by weight of Orgatix TC-100 (product of MATSUMOTO TRADING CO., LTD., titanium acetylacetonate) was added and, after mixing up by thorough stirring, a pressure sensitive adhesive film was obtained in the same manner as in Example 1.

Comparative Example 3

A pressure sensitive adhesive film was obtained in the same procedure as in Example 1 except that the pressure sensitive adhesive composition (E-6) was used in lieu of the pressure sensitive adhesive composition (E-1).

Each of the pressure sensitive adhesive films obtained in the above Examples and Comparative Examples was cut to give 25-mm-wide rectangular strips. Each strip was applied to a 25-mm-wide SUS 304 stainless steel adherend with the surface polished beforehand with a #280 sandpaper and, after 60 minutes of standing, the force required for peeling was measured. On that occasion, the peeling temperature and rate were 23° C. and 300 mm/min, respectively, and the peel angle was 180 degrees. The results thus obtained are shown in Table 1.

As is evident from the results shown in Table 1, the pressure sensitive adhesive composition of the invention manifests low viscosity and excellent adhesive strength.

The invention claimed is:

1. A pressure sensitive adhesive product
comprising a support
obtained by applying a pressure sensitive adhesive composition
which comprises the following components (A), (B) and (C) to the support and thermally curing the pressure sensitive adhesive composition:
(A) a hydrolyzable silyl group-containing organic polymer containing at least 1.3 hydrolyzable silyl groups per molecule and having a number average molecular weight of 20,000 to 50,000, the main chain of the organic polymer being substantially composed of a repeating unit or units represented by the general formula —$R^1$—O— ($R^1$ being a divalent alkylene group);
(B) a hydrolyzable silyl group-containing organic polymer containing 0.3 to 1.3 hydrolyzable silyl groups per molecule and having a number average molecular weight of 3,000 to 10,000, a compounding ratio of which is 3 to 100 parts by weight relative to 100 parts by weight of (A), and the main chain of which polymer being substantially composed of a repeating unit or units represented by the general formula —R'-O— (R' being a divalent alkylene group);
(C) a tackifier resin selected from the group consisting of terpene resins, terpene phenol resins, petroleum resins, rosin ester resins, and admixtures thereof, and
a compounding ratio of which is 30 to 100 parts by weight, relative to a combined total of 100 parts by weight of (A) and (B).

2. The pressure sensitive adhesive product according to claim 1
wherein the main chain of the hydrolyzable silyl group-containing organic polymers (A) and (B) is substantially polyoxypropylene.

3. The pressure sensitive adhesive product according to claim 2
wherein the hydrolyzable silyl group of the hydrolyzable silyl group-containing organic polymers (A) and (B) is represented by the following general formula (I):

$$—SiX_aR^2{}_{3-a} \qquad (I)$$

(wherein, $R^2$ represents a substituted or unsubstituted monovalent organic group containing 1 to 20 carbon atoms, X represents a hydrolyzable group, and a represents 1, 2 or 3).

TABLE 1

| | | Example 1 | Example 2 | Example 3 | Comparative Example 1 | Comparative Example 2 | Comparative Example 3 |
|---|---|---|---|---|---|---|---|
| Pressure sensitive adhesive composition | E-1 | 100 | | | | | |
| | E-2 | | 100 | | | | |
| | E-3 | | | 100 | | | |
| | E-4 | | | | 100 | | |
| | E-5 | | | | | 100 | |
| | E-6 | | | | | | 100 |
| Curing agent*2 | | 4 | 4 | 4 | 4 | 4 | 4 |
| Toluene | | — | — | — | — | 50 | — |
| Viscosity (Pa · s) | | 280.2 | 225.6 | 232.2 | 279.5 | 918.4 | 290.4 |
| Adhesive strength (N/25 mm) | | 30.6 | 25.4 | 26.8 | 7.6 | 10.2 | 9.8 |

*²Orgatix TC-100 (product of MATSUMOTO TRADING CO., LTD., titanium acetylacetonate)

4. The pressure sensitive adhesive product according to claim 1
wherein the hydrolyzable silyl group of the hydrolyzable silyl group-containing organic polymers (A) and (B) is represented by the following general formula (I):

   (I)

(wherein, $R^2$ represents a substituted or unsubstituted monovalent organic group containing 1 to 20 carbon atoms, X represents a hydrolyzable group, and a represents 1, 2 or 3).

5. The pressure sensitive adhesive product according to claim 1, wherein the support is at least one selected from the group consisting of synthetic resin films, modified natural films, paper, cloth and metal foils.

6. The pressure sensitive adhesive product according to claim 1, wherein the pressure sensitive adhesive composition is cured at a temperature of 50° to 180° for 1 minute to 1 hour.

7. The pressure sensitive adhesive product according to claim 1, which is selected from the group consisting of pressure sensitive adhesive tapes, pressure sensitive adhesive sheets, pressure sensitive adhesive films and pressure sensitive adhesive labels.

8. The pressure sensitive adhesive product according to claim 1, wherein the pressure sensitive adhesive composition does not contain a filler.

9. The pressure sensitive adhesive product according to claim 1, further comprising a release liner.

10. The pressure sensitive adhesive product according to claim 1, wherein the compounding ratio of (B) is 30 to 100 parts by weight relative to 100 parts by weight of (A).

* * * * *